United States Patent
Saji et al.

(10) Patent No.: US 9,903,469 B2
(45) Date of Patent: Feb. 27, 2018

(54) HYDRAULIC CONTROL DEVICE OF AUTOMATIC TRANSMISSION

(71) Applicant: Mazda Motor Corporation, Aki-gun, Hiroshima (JP)

(72) Inventors: Koshiro Saji, Hiroshima (JP); Shinya Kamada, Kure (JP); Shotaro Nagai, Hiroshima (JP); Yasunari Nakayama, Kure (JP); Masaru Nakagishi, Hiroshima (JP); Yasuo Shigenaka, Otake (JP); Motomi Kobayashi, Hiroshima (JP)

(73) Assignee: MAZDA MOTOR CORPORATION, Aki-gun, Hiroshima (JP)

( * ) Notice: Subject to any disclaimer, the term of this patent is extended or adjusted under 35 U.S.C. 154(b) by 320 days.

(21) Appl. No.: 14/892,157

(22) PCT Filed: May 23, 2014

(86) PCT No.: PCT/JP2014/002730
§ 371 (c)(1),
(2) Date: Nov. 18, 2015

(87) PCT Pub. No.: WO2014/196145
PCT Pub. Date: Dec. 11, 2014

(65) Prior Publication Data
US 2016/0109019 A1   Apr. 21, 2016

(30) Foreign Application Priority Data
Jun. 3, 2013 (JP) .................................. 2013-117056

(51) Int. Cl.
*F16H 61/38* (2006.01)
*F16H 61/4035* (2010.01)
(Continued)

(52) U.S. Cl.
CPC ..... *F16H 61/0265* (2013.01); *F16H 61/0206* (2013.01); *F16H 61/12* (2013.01);
(Continued)

(58) Field of Classification Search
CPC .. F16H 61/0265; F16H 61/0206; F16H 61/12; F16H 61/686; F16H 2061/062
(Continued)

(56) References Cited

U.S. PATENT DOCUMENTS 6,258,010 B1 * 7/2001 Bai ...................... F16H 61/0206
477/131
6,464,609 B1 * 10/2002 Bai ...................... F16H 61/0206
475/116
(Continued)

FOREIGN PATENT DOCUMENTS

CN   102378870 A   3/2012
JP   H09112690 A   5/1997
(Continued)

OTHER PUBLICATIONS

ISA Japanese Patent Office, International Search Report Issued in Application No. PCT/JP2014/002730, dated Aug. 26, 2014, WIPO, 2 pages.
(Continued)

*Primary Examiner* — Ha Dinh Ho
(74) *Attorney, Agent, or Firm* — Alleman Hall Creasman & Tuttle LLP

(57) ABSTRACT

A hydraulic control circuit includes: a shift valve configured to be switched between a state of supplying oil pressure to a clearance adjusting chamber of an LR brake and a state of discharging the oil pressure from the clearance adjusting chamber of the LR brake; and a linear SV configured to control the oil pressure supplied to a pressing chamber of the LR brake. The hydraulic control circuit further includes a
(Continued)

source pressure oil passage through which oil pressure equal to the oil pressure supplied from the shift valve to the clearance adjusting chamber is supplied to a source pressure port a of the linear SV. By discharging the oil pressure in the clearance adjusting chamber at the time of opening malfunction of the linear SV, the oil pressure in the pressing chamber is also discharged through a drain port of the shift valve.

6 Claims, 10 Drawing Sheets

(51) Int. Cl.
  *F16H 61/02* (2006.01)
  *F16H 61/12* (2010.01)
  *F16H 61/686* (2006.01)
  *F16H 61/06* (2006.01)

(52) U.S. Cl.
  CPC ..... *F16H 61/686* (2013.01); *F16H 2061/062* (2013.01); *F16H 2061/1204* (2013.01); *F16H 2061/1252* (2013.01)

(58) Field of Classification Search
  USPC .......................................................... 74/335
  See application file for complete search history.

(56) References Cited

U.S. PATENT DOCUMENTS

| | | | | |
|---|---|---|---|---|
| 8,088,039 | B2* | 1/2012 | Nishimine | F16H 61/0206 477/131 |
| 8,978,500 | B2* | 3/2015 | Yagi | F16H 61/0206 192/3.28 |
| 9,709,162 | B2* | 7/2017 | Saji | F16H 61/0206 |

FOREIGN PATENT DOCUMENTS

| | | |
|---|---|---|
| JP | 2005265063 A | 9/2005 |
| JP | 2009014142 A | 1/2009 |
| JP | 2009204067 A | 9/2009 |
| JP | 2010209934 A | 9/2010 |

OTHER PUBLICATIONS

ISA Japanese Patent Office, Translation of Written Opinion Issued in Application No. PCT/JP2014/002730, dated Aug. 26, 2014, WIPO, 5 pages.
State Intellectual Property Office of the People's Republic of China, Office Action and Search Report Issued in Application No. 201480002483.7, dated Nov. 25, 2015, 7 pages. (Submitted with Translation of Search Report).

* cited by examiner

| | LOW CLUTCH (40) | HIGH CLUTCH (50) | LR BRAKE (60) | 26 BRAKE (70) | R35 BRAKE (80) |
|---|---|---|---|---|---|
| FIRST GEAR STAGE | ENGAGED | | ENGAGED | | |
| SECOND GEAR STAGE | ENGAGED | | | ENGAGED | |
| THIRD GEAR STAGE | ENGAGED | | | | ENGAGED |
| FOURTH GEAR STAGE | ENGAGED | ENGAGED | | | |
| FIFTH GEAR STAGE | | ENGAGED | | | ENGAGED |
| SIXTH GEAR STAGE | | ENGAGED | | ENGAGED | |
| REVERSE GEAR STAGE | | | ENGAGED | | ENGAGED |

HYDRAULIC CONTROL DEVICE OF AUTOMATIC TRANSMISSION

TECHNICAL FIELD

The present invention relates to a hydraulic control device of an automatic transmission mounted on a vehicle and belongs to a technical field of automatic transmissions for vehicles.

BACKGROUND ART

An automatic transmission is configured to automatically switch shift gear stages, that is, power transmission paths by selective engagement of a plurality of hydraulic friction engaging elements, each of the power transmission paths being constituted by a planetary gear mechanism and the like. Each of the shift gear stages is basically formed by the engagement of two friction engaging elements. However, a first gear stage in a D range (drive range) is conventionally formed by one friction engaging element and an OWC (one-way clutch) for the purpose of, for example, smoothing of a gear shift operation.

However, the OWC is high in cost. In addition, the OWC incurs rotational resistance at gear stages other than the first gear stage in the D range, and this hinders improvement of fuel efficiency of an engine. On this account, discontinuation of the OWC has been proposed or executed in recent years.

In this case, the first gear stage is formed by, for example, engaging a friction engaging element such as a low clutch engaged at predetermined low shift gear stages including the first gear stage and a friction engaging element such as a low reverse brake engaged at the first gear stage and a reverse gear stage. The shifting to the first gear stage is performed by engaging the latter friction engaging element in a state where the former friction engaging element is engaged. Therefore, to successfully shift to the first gear stage from the other shift gear stage, it is necessary to precisely perform a control operation of a timing of the engagement of the friction engaging element such as the low reverse brake and a control operation of engaging power of the friction engaging element.

To solve such problems, PTL 1 discloses a low reverse brake using a tandem hydraulic actuator including two pistons.

As shown in FIGS. 11A and 11B, a low reverse brake A is configured such that a plurality of friction plates D are arranged between a transmission case B and a rotary member C accommodated in the case B, the friction plates D being alternately splined to an inner peripheral surface of the case and an outer peripheral surface of the rotary member. Further, the low reverse brake A includes: a pressing piston F configured to press the friction plates D against biasing force of a return spring E; and a clearance adjusting piston G provided behind the pressing piston F for adjustment of a clutch clearance.

According to the low reverse brake A, when the low reverse brake A is not engaged, as shown in FIG. 11A, each of the pressing piston F and the clearance adjusting piston G is held at a retreated position by the biasing force of the return spring E, and a relatively large clutch clearance is generated between a tip end of the pressing piston F and a stopper member H, the clutch clearance being obtained by subtracting the sum of thicknesses of the friction plates D from a distance between the tip end of the pressing piston F and the stopper member H. In this state, by applying oil pressure to the clearance adjusting piston G, as shown in FIG. 11B, the piston G and the pressing piston F moves forward against the biasing force of the return spring E to a stroke end of the clearance adjusting piston G. With this, the clutch clearance becomes smaller than that shown in FIG. 11A by a distance of the forward movement of each of the pistons F and G.

The oil pressure is previously supplied to an oil pressure chamber (hereinafter referred to as a "clearance adjusting chamber") I of the clearance adjusting piston G. With this, when the oil pressure is supplied to an oil pressure chamber (hereinafter referred to as a "pressing chamber") J of the pressing piston F for engaging the low reverse brake A, the low reverse brake A is engaged with good responsiveness. Thus, the timing of the engagement and the engaging power can be precisely controlled.

CITATION LIST

Patent Literature

PTL 1: Japanese Laid-Open Patent Application Publication No. 2005-265063

SUMMARY OF INVENTION

Technical Problem

In a case where the above-described tandem hydraulic actuator is used in the friction engaging element such as the low reverse brake, the supply of the oil pressure by the actuator to two oil pressure chambers that are the clearance adjusting chamber and the pressing chamber is performed in such a manner that as disclosed in PTL 1, oil passages through which line pressure is supplied to two oil pressure chambers are provided, hydraulic control valves such as solenoid valves are provided for these oil passages, respectively, and the oil pressure supplied to the clearance adjusting chamber and the oil pressure supplied to the pressing chamber are separately controlled. However, according to this configuration, at the time of the shifting in which the above friction engaging element is involved, the following failure may occur by malfunction of the hydraulic control valve.

To be specific, when the friction engaging element is released from an engaged state, that is, when shifting, and if an opening malfunction of the hydraulic control valve configured to control the oil pressure supplied to the pressing chamber (i.e., a malfunction in which the hydraulic control valve is not operable while continuing to supply the oil pressure) occurs, the line pressure is still supplied to the pressing chamber even if the oil pressure of the clearance adjusting chamber is discharged. Thus, a state where the pressing piston presses the friction plates is not released, and therefore, the friction engaging element is not released. On this account, when the other friction engaging element engaged at the next shift gear stage is engaged, the friction engaging elements in the automatic transmission are engaged more than necessary, and this causes a so-called interlock state of the automatic transmission.

An object of the present invention is to, in an automatic transmission including a friction engaging element having a tandem hydraulic actuator, prevent generation of an interlock state caused when the friction engaging element cannot be released due to malfunction of a hydraulic control valve.

Solution to Problem

To solve the above problems, the present invention is configured as below.

A first aspect of the present invention includes a hydraulic control device of an automatic transmission including a friction engaging element having a clearance adjusting chamber and a pressing chamber, the hydraulic control device including: a switching valve configured to be switched between a state of supplying oil pressure to the clearance adjusting chamber and a state of discharging the oil pressure from the clearance adjusting chamber; a hydraulic control valve configured to control supply of the oil pressure to the pressing chamber; and a source pressure oil passage through which oil pressure equal to the oil pressure supplied from the switching valve to the clearance adjusting chamber is supplied to a source pressure port of the hydraulic control valve.

A second aspect of the present invention is configured such that in the hydraulic control device according to the first aspect of the present invention, a second switching valve is disposed on a pressing oil passage through which the oil pressure is supplied from the hydraulic control valve to the pressing chamber, the second switching valve becoming a first state when the oil pressure supplied from the switching valve to the clearance adjusting chamber is not less than a predetermined pressure and becoming a second state when the oil pressure supplied from the switching valve to the clearance adjusting chamber is less than the predetermined pressure, the first state being a state where the second switching valve opens the pressing oil passage, the second state being a state where the second switching valve closes the pressing oil passage and discharges the oil pressure in the pressing chamber.

A third aspect of the present invention is configured such that in the hydraulic control device according to the second aspect of the present invention, the source pressure oil passage extends through the second switching valve, and the second switching valve opens the source pressure oil passage when the second switching valve is in the first state, and the second switching valve closes the source pressure oil passage when the second switching valve is in the second state.

A fourth aspect of the present invention is configured such that in the hydraulic control device according to the second or third aspect of the present invention, when the second switching valve closes the pressing oil passage and discharges the oil pressure in the pressing chamber in the second state, the second switching valve connects an upstream portion of the pressing oil passage, which extends from the hydraulic control valve, to an oil passage communicating with another friction engaging element.

A fifth aspect of the present invention is configured such that in the hydraulic control device according to the first aspect of the present invention, when releasing the friction engaging element during shifting by discharging the oil pressure from the clearance adjusting chamber and the pressing chamber, but when the oil pressure in the pressing chamber is not discharged due to malfunction of the hydraulic control valve, a control source pressure of the hydraulic control valve is discharged by discharging the oil pressure in the clearance adjusting chamber by the switching valve, and thereby the oil pressure in the pressing chamber is discharged.

Advantageous Effects of Invention

According to the above configurations, the following effects can be obtained by the invention recited in claims of the present application.

According to the first aspect of the present invention, the automatic transmission includes: the friction engaging element in which the oil pressure is supplied to the clearance adjusting chamber and the pressing chamber when the friction engaging element is engaged; the switching valve configured to be switched between the state of supplying the oil pressure to the clearance adjusting chamber and the state of discharging the oil pressure from the clearance adjusting chamber; and the hydraulic control valve configured to control the supply of the oil pressure to the pressing chamber. The automatic transmission further includes the source pressure oil passage through which the oil pressure supplied from the switching valve to the clearance adjusting chamber is supplied as the control source pressure to the source pressure port of the hydraulic control valve. Therefore, when releasing the friction engaging element during shifting by discharging the oil pressure from the clearance adjusting chamber and the pressing chamber, but when the oil pressure of the pressing chamber is not discharged due to the opening malfunction of the hydraulic control valve, the control source pressure of the hydraulic control valve is discharged by discharging the oil pressure in the clearance adjusting chamber by the switching valve, and as a result, the oil pressure in the pressing chamber is also discharged.

Therefore, even if the opening malfunction of the hydraulic control valve occurs or has occurred at the time of the above shifting, the automatic transmission is prevented from becoming the interlock state caused by the friction engaging element not being released.

According to the second aspect of the present invention, the second switching valve is disposed on the pressing oil passage through which the oil pressure is supplied from the hydraulic control valve to the pressing chamber. When the oil pressure supplied from the switching valve to the clearance adjusting chamber is not less than the predetermined pressure, the second switching valve opens the pressing oil passage. Therefore, if the oil pressure that is not less than the predetermined pressure is not supplied to the clearance adjusting chamber when engaging the friction engaging element, that is, when shifting, the oil pressure cannot be supplied to the pressing chamber.

Therefore, the order of supply of the oil pressure to the clearance adjusting chamber and the pressing chamber is controlled to become the above order. Therefore, in a state where the clutch clearance is always made small, the friction engaging element is engaged. Thus, the timing of the engagement of the friction engaging element, the engaging power of the friction engaging element, and the like are precisely controlled.

According to the third aspect of the present invention, the source pressure oil passage extends through the second switching valve disposed on the pressing oil passage, and the second switching valve opens the source pressure oil passage when the second switching valve is in the first state. Therefore, if the oil pressure is not supplied to the clearance adjusting chamber when engaging the friction engaging element, that is, when shifting, the supply of the source pressure to the hydraulic control valve cannot be performed. With this, the engagement of the friction engaging element can be more surely performed in a state where the clutch clearance is made small.

According to the fourth aspect of the present invention, when the second switching valve becomes the second state to discharge the oil pressure in the pressing chamber, that is, when the friction engaging element is released, the upstream portion of the pressing oil passage extending from the hydraulic control valve is connected to the oil passage communicating with another friction engaging element. Therefore, when the friction engaging element is released, the friction engaging element with which the oil passage communicates can be engaged.

To be specific, one hydraulic control valve can be used to control the supply of the oil pressure to two friction engaging elements. Thus, the configuration of the hydraulic control device is simpler than a case where hydraulic control valves are provided for respective friction engaging elements.

DESCRIPTION OF EMBODIMENTS

Hereinafter, embodiments of the present invention will be explained.

Figures 1, 2:
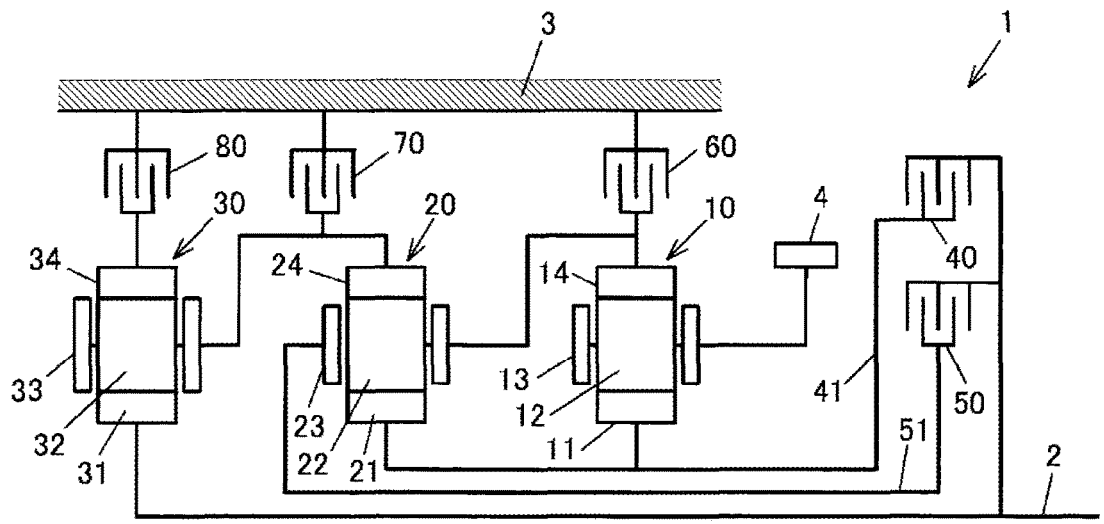
FIG. 1 is a schematic diagram showing major components of an automatic transmission according to embodiments of the present invention.
FIG. 2 is a table showing a relationship among combinations of engagement of friction engaging elements and shift gear stages.

FIG. 1 is a schematic diagram showing the configuration of an automatic transmission according to the embodiments of the present invention. An automatic transmission 1 includes an input shaft 2. An engine output is input to the input shaft 2 through a torque converter (not shown). First, second, and third planetary gear sets (hereinafter referred to as "first, second, and third gear sets") 10, 20, and 30 are arranged on the input shaft 2 in this order from an engine side (a right side in FIG. 1). As hydraulic friction engaging elements for switching power transmission paths constituted by the gear sets 10 to 30, the automatic transmission 1 includes a low clutch 40, a high clutch 50, a low reverse brake 60 (hereinafter referred to as an "LR brake 60"), a second/sixth gear stage brake 70 (hereinafter referred to as a "26 brake 70"), and a reverse/third/fifth gear stage brake 80 (hereinafter referred to as an "R35 brake 80"). Each of the low clutch 40 and the high clutch 50 selectively transmits power from the input shaft 2 to the gear set 10, 20, or 30. Each of the LR brake 60, the 26 brake 70, and the R35 brake 80 fixes a predetermined rotational element among the gear sets 10, 20, and 30.

Each of the gear sets 10, 20, and 30 is constituted by: a sun gear (11, 21, 31); a plurality of pinions (12, 22, 32) which mesh with the sun gear (11, 21, 31); a carrier (13, 23, 33) which supports the pinions (12, 22, 32); and a ring gear (14, 24, 34) which meshes with the pinions (12, 22, 32).

The sun gear 11 of the first gear set 10 and the sun gear 21 of the second gear set 20 are connected to each other to be coupled to an output member 41 of the low clutch 40. The carrier 23 of the second gear set 20 is coupled to an output member 51 of the high clutch 50. The input shaft 2 is directly coupled to the sun gear 31 of the third gear set 30.

The ring gear 14 of the first gear set 10 and the carrier 23 of the second gear set 20 are connected to each other, and the LR brake 60 is provided between a transmission case 3 and a group of the ring gear 14 and the carrier 23. The ring gear 24 of the second gear set 20 and the carrier 33 of the third gear set 30 are connected to each other, and the 26 brake 70 is provided between the transmission case 3 and a group of the ring gear 24 and the carrier 33. Further, the R35 brake 80 is provided between the transmission case 3 and the ring gear 34 of the third gear set 30. An output gear 4 is coupled to the carrier 13 of the first gear set 10. The output gear 4 supplies an output of the automatic transmission 1 to a driving wheel (not shown).

With this configuration, as shown in FIG. 2, the automatic transmission 1 forms first to sixth gear stages in a D range and a reverse gear stage in an R range (reverse range) by combinations of engagement of the low clutch 40, the high clutch 50, the LR brake 60, the 26 brake 70, and the R35 brake 80. The LR brake 60 corresponds to the "friction engaging element" in "Solution to Problem."

The automatic transmission 1 includes a hydraulic control circuit. The hydraulic control circuit selectively supplies the oil pressure to the friction engaging elements 40 to 80 to form the shift gear stages. Next, the configuration of a hydraulic control circuit 100 will be explained in reference to FIG. 3, and especially the configurations of portions which relate to control when shifting from the first gear stage to the second gear stage in the D range will be explained in reference to FIG. 3.

Figure 3:
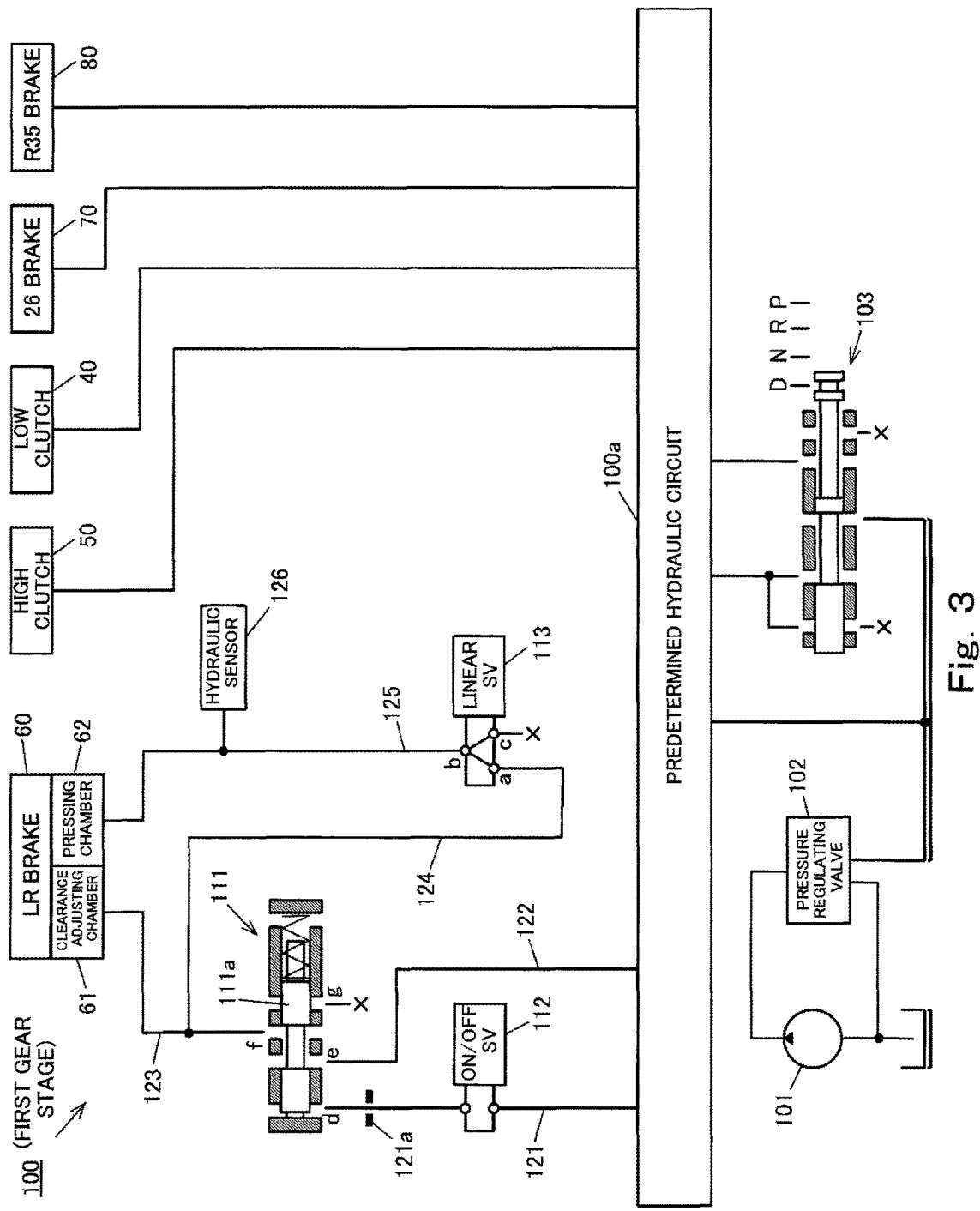
FIG. 3 is a circuit diagram showing configurations of major components of a hydraulic control circuit according to Embodiment 1.

The hydraulic control circuit 100 of Embodiment 1 of the present invention shown in FIG. 3 includes a pressure regulating valve 102 and a manual valve 103. The pressure regulating valve 102 adjusts a discharge pressure of an oil pump 101 into a line pressure that is a predetermined oil pressure. The manual valve 103 switches destinations to which the line pressure is supplied, in accordance with the range selected by a driver. The line pressure is output toward the friction engaging elements 40 to 80 through a predetermined hydraulic circuit 100a including various valves.

Figure 11A:
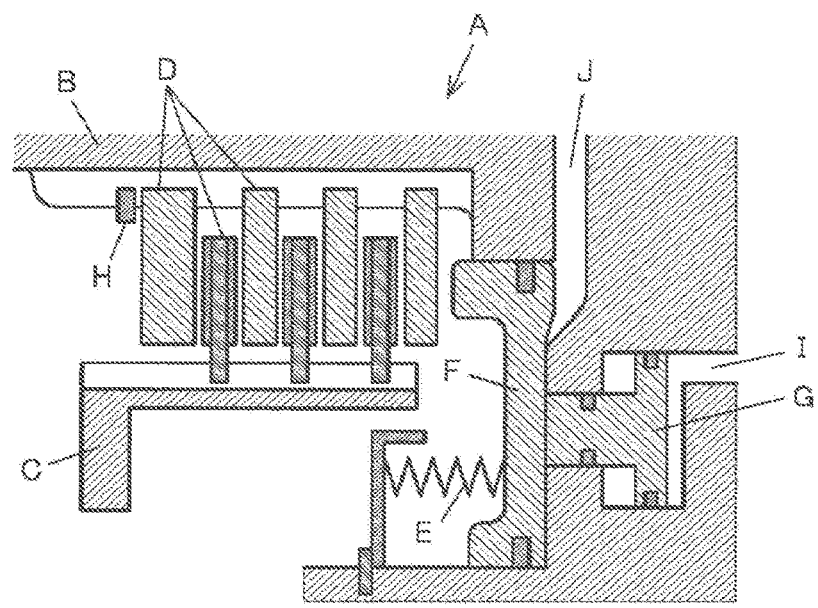
FIG. 11A is an explanatory diagram showing the configuration and operations of a tandem hydraulic actuator and shows a state when not engaged.
Figure 11B:
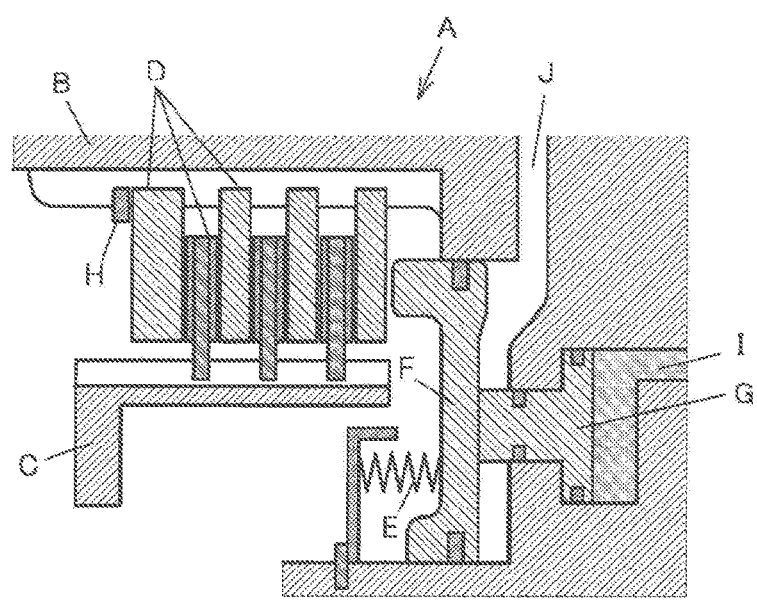
FIG. 11B is an explanatory diagram showing the configuration and operations of the tandem hydraulic actuator and shows a state when engaged.

The LR brake 60 includes a tandem hydraulic actuator configured as shown in, for example, FIGS. 11A and 11B, and the oil pressure is supplied to an oil pressure chamber (clearance adjusting chamber) 61 for adjusting a clutch clearance and an oil pressure chamber (pressing chamber) 62 for pressing a pressing piston to engage friction plates.

The hydraulic control circuit 100 includes a shift valve 111, an on/off solenoid valve (hereinafter referred to as an "on/off SV") 112, and a linear solenoid valve (hereinafter referred to as a "linear SV") 113. The shift valve 111 is switched between a state of supplying the oil pressure to the clearance adjusting chamber 61 of the LR brake 60 and a state of discharging the oil pressure from the clearance adjusting chamber 61 of the LR brake 60. The on/off SV 112 switches the shift valve 111. The linear SV 113 controls the oil pressure supplied to the pressing chamber 62 of the LR brake 60. It should be noted that the shift valve 111 corresponds to the "switching valve" in "Solution to Problem," and the linear SV 113 corresponds to the "hydraulic control valve" in "Solution to Problem."

The on/off SV 112 and the linear SV 113 operates by control signals from a below-described control device 150. The on/off SV 112 opens and closes upstream and downstream sides of an oil passage 121 on which the on/off SV 112 is disposed. When the on/off SV 112 closes the oil passage 121, the on/off SV 112 discharges the pressure in a downstream-side oil passage. The linear SV 113 adjusts the oil pressure, input to a source pressure port a, into a control pressure that is a predetermined oil pressure, to output the control pressure through an output port b, or closes a passage between the ports a and b and causes the output port b to communicate with a drain port c.

The shift valve 111 includes a control port d. The control port d is provided at an end portion opposite to an end portion to which a return spring of a spool 111a is attached. When the on/off SV 112 closes the oil passage 121 to discharge the pressure through the control port d, the spool 111a is located at a set position (position when the return spring expands) shown in FIG. 3 by biasing force of the return spring. At this time, when the on/off SV 112 opens the oil passage 121, the line pressure is introduced as pilot pressure to the control port d. With this, the spool 111a moves to a stroke position against the biasing force of the return spring, the stroke position being located at a right side in FIG. 3.

To relax impact generated when introducing the pilot pressure to the control port d, an orifice 121a is provided on the oil passage 121 so as to be located between the on/off SV 112 and the control port d.

The shift valve 111 includes an LR brake input port e, an LR brake output port f, and a drain port g. When the spool 111a is located at the set position, the input and output ports e and f communicate with each other. With this, the line pressure supplied through an oil passage 122 is supplied to the clearance adjusting chamber 61 of the LR brake 60 through an oil passage 123. In contrast, when the spool 111a is located at the stroke position (position when the return spring contracts), the passage between the input and output ports e and f is closed. With this, the output port f communicates with the drain port g, so that the pressure in the clearance adjusting chamber 61 of the LR brake 60 is discharged through the oil passage 123.

Further, an oil passage (hereinafter referred to as a "source pressure oil passage") 124 communicating with the source pressure port a of the linear SV 113 branches from the oil passage 123 extending between the shift valve 111 and the clearance adjusting chamber 61. Oil pressure equal to the oil pressure supplied to the clearance adjusting chamber 61 of the LR brake 60 through the source pressure oil passage 124 is supplied as a control source pressure from the shift valve 111 to the linear SV 113.

The linear SV 113 adjusts the supplied source pressure into a predetermined oil pressure (hereinafter referred to as "pressing chamber oil pressure") supplied to the pressing chamber 62 of the LR brake 60. The linear SV 113 supplies the pressing chamber oil pressure to the pressing chamber 62 through an oil passage (hereinafter referred to as a "pressing oil passage") 125. An oil pressure sensor 126 configured to detect the pressing chamber oil pressure is disposed on the pressing oil passage 125.

Figure 4:
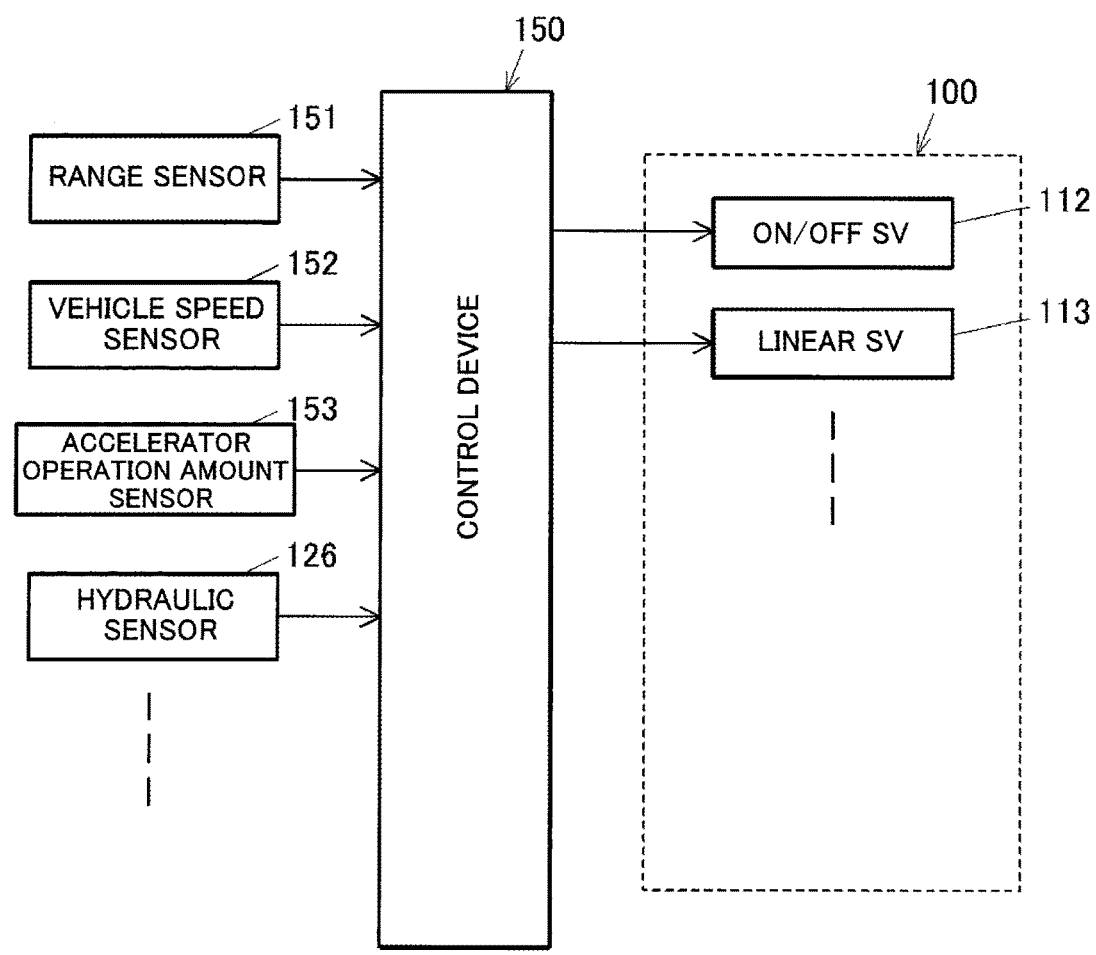
FIG. 4 is a block diagram showing major components of a control system of the hydraulic control circuit according to Embodiment 1.

In addition to the above configuration, the automatic transmission 1 includes the control device 150 configured to control the solenoid valves of the hydraulic control circuit 100 to form the shift gear stage corresponding to a driving state. As shown in FIG. 4, the control device 150 receives a signal from a range sensor 151 configured to detect the range selected by the operation of the driver, a signal from a vehicle speed sensor 152 configured to detect the speed of a vehicle, a signal from an accelerator operation amount sensor 153 configured to detect an operation amount of an accelerator pedal operated by the driver, a signal from the oil pressure sensor 126 disposed on the pressing oil passage 125 shown in FIG. 3, and the like.

In accordance with the driving state indicated by these signals, the control device 150 outputs the control signals to the on/off SV 112 and linear SV 113 of the hydraulic control circuit 100 and the other solenoid valves of the predetermined hydraulic circuit 100a. Thus, the oil pressure is selectively supplied to the predetermined friction engaging elements, so that the shift gear stage corresponding to the driving state is formed.

Next, specific operations of the oil pressure control when shifting from the first gear stage to the second gear stage in the D range by the operations of the solenoid valves will be explained in reference to the flow chart of FIG. 5 and the time chart of FIG. 6.

First, a state of the first gear stage before the shifting will be explained. At the first gear stage, as shown in FIG. 3, the pilot pressure is discharged through the control port d of the shift valve 111 by the on/off SV 112, and the spool 111a is located at the set position. Therefore, the line pressure supplied through the oil passage 122 is supplied to the clearance adjusting chamber 61 of the LR brake 60 and is also supplied as the control source pressure to the source pressure port a of the linear SV 113.

The linear SV 113 adjusts the source pressure into a control pressure that is a predetermined oil pressure, and this control oil pressure is supplied as pressing oil pressure to the pressing chamber 62 of the LR brake 60. Therefore, the LR brake 60 is engaged by the supply of the oil pressure to both the clearance adjusting chamber 61 and the pressing chamber 62. Further, the low clutch 40 is also engaged. With this, the shift gear stage of the automatic transmission 1 is the first gear stage.

Figure 5:
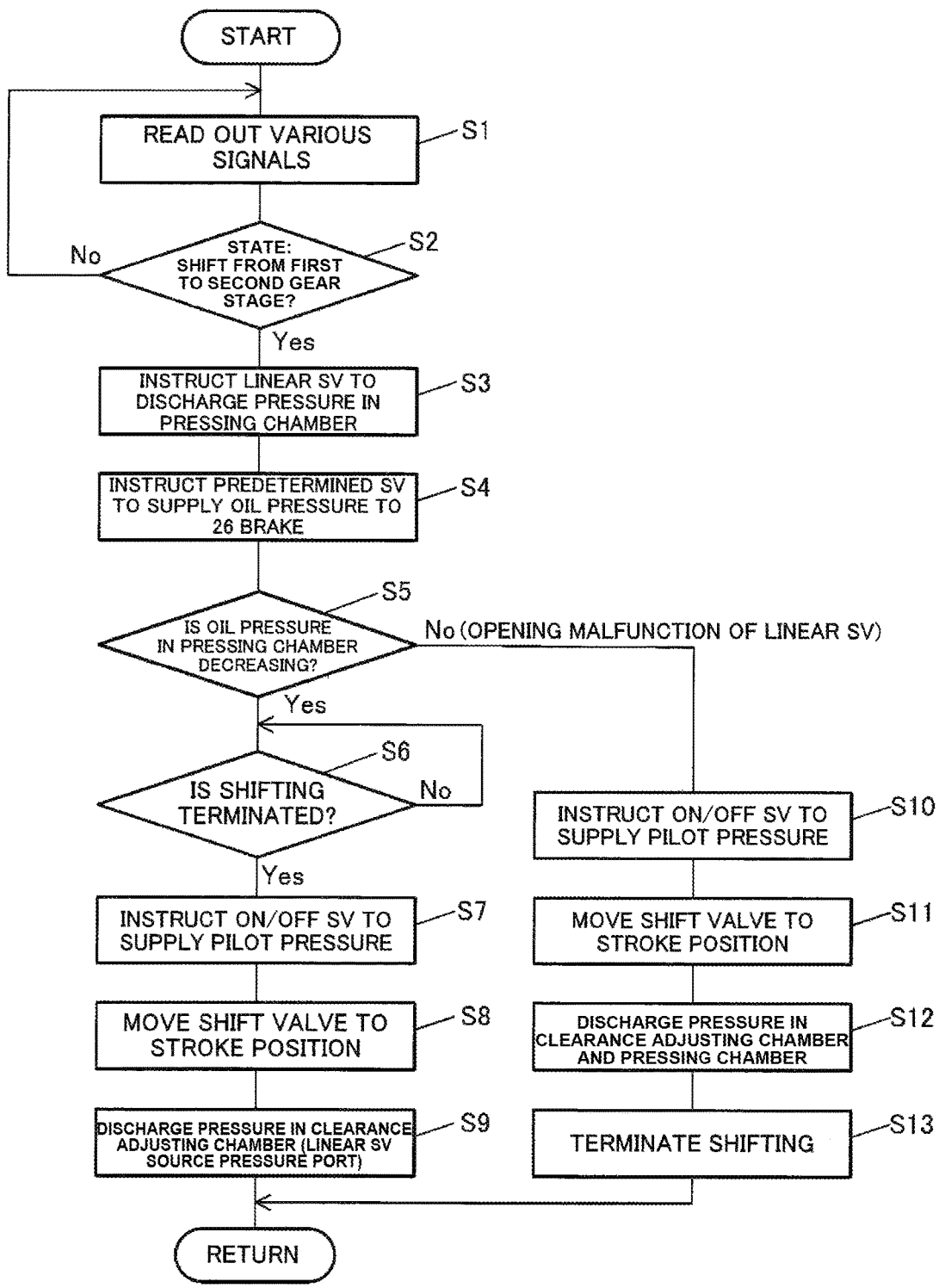
FIG. 5 is a flow chart showing operations of the control system when shifting from a first gear stage to a second gear stage.

In this state, the control device 150 reads out the signals from various sensors in Step S1 in the flow chart of FIG. 5. In Step S2, whether or not the current driving state is a state where the first gear stage should be shifted to the second gear stage in the D range is determined.

Figure 6:
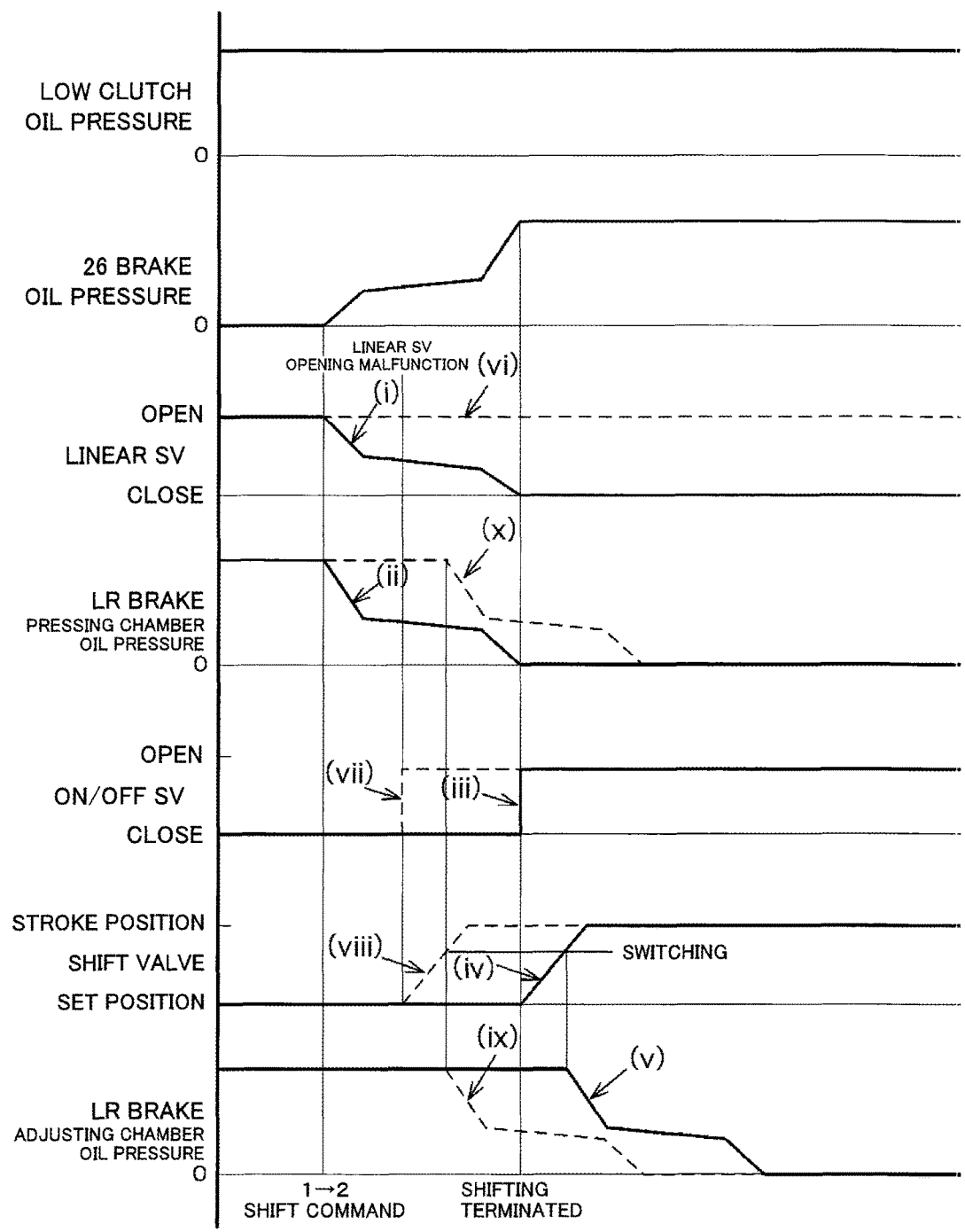
FIG. 6 is a time chart showing state changes of respective portions when shifting from the first gear stage to the second gear stage.

When it is determined that the current driving state is the state where the first gear stage should be shifted to the second gear stage, in Step S3, the control device 150 outputs a control signal as a shift command for shifting from the first gear stage to the second gear stage, to the linear SV 113 such that the oil pressure in the pressing chamber 62 of the LR brake 60 is discharged through the drain port c (see FIG. 6, reference sign (i)). After that, in Step S4, the control device 150 outputs a control signal to a predetermined solenoid valve of the predetermined hydraulic circuit 100a such that the predetermined solenoid valve supplies the oil pressure to the 26 brake 70.

Next, in Step S5, based on the signal from the oil pressure sensor 126, the control device 150 determines whether or not the pressing chamber oil pressure in the pressing chamber 62 of the LR brake 60 starts decreasing. When the linear SV 113 normally operates, and the pressure discharge operation is appropriately performed, the pressing chamber oil pressure decreases (see FIG. 6, reference sign (ii); Yes in Step S5). Therefore, in Step S6, the control device 150 awaits the termination of the shifting to the second gear stage.

To be specific, by the control operations in Steps S3 and S4 from the state of the first gear stage where the low clutch 40 and the LR brake 60 are engaged, the LR brake 60 is released by the discharge of the oil pressure from the pressing chamber 62 of the LR brake 60, and the 26 brake 70 is engaged by the supply of the oil pressure to the 26 brake 70. With this, the shift gear stage becomes the second gear stage.

When it is determined that the shifting to the second gear stage is terminated (Yes in Step S6), in Step S7, the control device 150 outputs a control signal to the on/off SV 112 such that the on/off SV 112 supplies the pilot pressure to the control port d of the shift valve 111 (see FIG. 6, reference sign (iii)).

With this, in Steps S8 and S9, the spool 111a of the shift valve 111 moves from the set position shown in FIG. 3 to the stroke position at the right side (see FIG. 6, reference sign (iv)). When the spool 111a reaches a predetermined position, the oil passage 123 extending between the shift valve 111 and the clearance adjusting chamber 61 of the LR brake 60 communicates with the drain port g of the shift valve 111. As a result, the oil pressure in the clearance adjusting chamber 61 is discharged (see FIG. 6, reference sign (v)). Thus, the oil pressure is discharged from both the oil pressure chambers 61 and 62 of the LR brake 60.

At this time, the source pressure port a of the linear SV 113 also communicates with the drain port g of the shift valve 111 through the source pressure oil passage 124 branching from the oil passage 123. Thus, the source pressure port a of the linear SV 113 becomes a pressure discharged state.

In contrast, in Step S5, when it is determined that the pressing chamber oil pressure indicated by the signal from the oil pressure sensor 126 does not decrease, in other words, when the source pressure port a and output port b of the linear SV 113 keeps communicating with each other by the opening malfunction of the linear SV 113 even though the control device 150 has output to the linear SV 113 the control signal for instructing the pressure discharge (see FIG. 6, reference sign (vi)), Steps S10 to S13 are executed.

First, Steps S10 and S11 are as below. Immediately after the control device 150 determines the opening malfunction of the linear SV 113, the control device 150 outputs a control signal to the on/off SV 112 such that the on/off SV 112 supplies the pilot pressure to the control port d of the shift valve 111. With this, the spool 111a of the shift valve 111 moves from the set position to the stroke position (see FIG. 6, reference signs (vii) and (viii)).

When the spool 111a reaches the predetermined position, in Step S12, the oil pressure in the clearance adjusting chamber 61 of the LR brake 60 is discharged through the oil passage 123 (see FIG. 6, reference sign (ix)). Further, the source pressure port a of the linear SV 113 communicates with the drain port g of the shift valve 111 through the source pressure oil passage 124 branching from the oil passage 123. With this, the pressing chamber 62 communicates with the drain port g of the shift valve 111 through the oil passage 125, the ports b and a of the linear SV 113, and the oil passages 124 and 123. Therefore, the pressing chamber oil pressure in the pressing chamber 62 is discharged through the drain port g of the shift valve 111 (see FIG. 6, reference sign (x)).

With this, even in a case where the opening malfunction of the linear SV 113 is occurring when shifting from the first gear stage to the second gear stage, the LR brake 60 is released by discharging the oil pressure from the pressing chamber 62 of the LR brake 60, and in Step S13, the shifting to the second gear stage is terminated. Therefore, the interlock of the automatic transmission 1 is prevented, the interlock being caused due to the 26 brake 70 being engaged without releasing the LR brake 60 in a state where the low clutch 40 is engaged.

Next, a hydraulic control circuit 200 according to Embodiment 2 and a hydraulic control circuit 300 according to Embodiment 3 will be explained in reference to FIGS. 7 to 10. Each of Embodiments 2 and 3 are the same in configuration as Embodiment 1 except for the hydraulic control circuit. Therefore, the same reference signs are used for the same components.

First, the hydraulic control circuit 200 according to Embodiment 2 shown in FIGS. 7 and 8 will be explained. As with the hydraulic control circuit 100 according to Embodiment 1, the hydraulic control circuit 200 includes a pressure regulating valve 202 and a manual valve 203. The pressure regulating valve 202 adjusts discharge pressure of an oil pump 201 into a line pressure that is a predetermined oil pressure. The manual valve 203 switches destinations to which the line pressure is supplied, in accordance with the range selected by a driver. The line pressure is output toward the friction engaging elements 40 to 80 through a predetermined hydraulic circuit 200a including various valves. The LR brake 60 includes a tandem hydraulic actuator, and the oil pressure is supplied to the clearance adjusting chamber 61 and the pressing chamber 62.

Further, the hydraulic control circuit 200 includes a shift valve 211, an on/off SV 212, and a linear SV 213. The shift valve 211 is switched between a state of supplying the oil pressure to the clearance adjusting chamber 61 of the LR brake 60 and a state of discharging the oil pressure from the clearance adjusting chamber 61 of the LR brake 60. The on/off SV 212 switches the shift valve 211. The linear SV 213 controls the oil pressure supplied to the pressing chamber 62 of the LR brake 60.

In addition to these valves 211 to 213, the hydraulic control circuit 200 according to Embodiment 2 includes a sequence valve 214. The sequence valve 214 controls the order of the supply of the oil pressure to the clearance adjusting chamber 61 and pressing chamber 62 of the LR brake 60. The sequence valve 214 corresponds to the "second switching valve" in "Solution to Problem."

The operations of the on/off SV 212 and the linear SV 213, the configuration of the shift valve 211, and the like in Embodiment 2 are the same as those of the hydraulic control circuit 100 in Embodiment 1. The on/off SV 212 opens and closes upstream and downstream sides of an oil passage 221 on which the on/off SV 212 is disposed. When the on/off SV 212 closes the oil passage 221, the on/off SV 212 discharges the pressure at the downstream side. The linear SV 213 adjusts the control source pressure, supplied to the source pressure port a, into the control pressure that is a predetermined oil pressure, to output the control pressure to the output port b, or closes a passage between the ports a and b and causes the output port b to communicate with the drain port c.

The shift valve 211 includes a control port d. The control port d is provided at an end portion opposite to an end portion to which a return spring of a spool 211a is attached. When the on/off SV 212 closes the oil passage 221 to discharge the pressure through the control port d, the spool 211a is located at the set position shown in FIG. 7 by biasing force of the return spring. Therefore, when the on/off SV 212 opens the oil passage 221, the pilot pressure is introduced through an orifice 221a to the control port d. Thus, the spool 211a moves to the stroke position shown in FIG. 8 against the biasing force of the return spring.

The shift valve 211 includes an input port e and an output port f for the clearance adjusting chamber 61 of the LR brake 60 and further includes a drain port g. When the spool 211a is located at the set position, the input and output ports e and f communicate with each other. With this, the line pressure supplied through an oil passage 222 is supplied to the clearance adjusting chamber 61 of the LR brake 60 through an oil passage 223. In contrast, when the spool 211a is located at the stroke position, a passage between the input and output ports e and f is closed. With this, the output port f communicates with the drain port g, so that the pressure in the clearance adjusting chamber 61 of the LR brake 60 is discharged through the oil passage 223.

Further, a source pressure oil passage 224 communicating with the source pressure port a of the linear SV 213 branches from the oil passage 223 extending between the shift valve 211 and the clearance adjusting chamber 61. Oil pressure equal to the oil pressure supplied to the clearance adjusting chamber 61 of the LR brake 60 through the oil passage 224 is supplied as the control source pressure from the shift valve 211 to the linear SV 213.

The linear SV 213 adjusts the supplied source pressure into predetermined pressing chamber oil pressure supplied to the pressing chamber 62 of the LR brake 60. The linear SV 213 supplies the pressing chamber oil pressure to the pressing chamber 62 through a pressing oil passage 225. The sequence valve 214 is disposed on the pressing oil passage 225.

The sequence valve 214 includes a control port h. The control port h is provided at an end portion opposite to an end portion to which a return spring of a spool 214a is attached. Oil pressure equal to the oil pressure supplied from the shift valve 211 to the clearance adjusting chamber 61 of the LR brake 60 is supplied as the pilot pressure through an oil passage 226 and an orifice 226a to the control port h, the oil passage 226 branching from the source pressure oil passage 224. When the pilot pressure is supplied to the clearance adjusting chamber 61, the spool 214a moves from the set position shown in FIG. 8 to the stroke position shown in FIG. 7 against the biasing force of the return spring.

The sequence valve 214 includes an input port i and an output port j for the pressing chamber 62 of the LR brake 60 and further includes a drain port k. When the spool 214a is located at the stroke position, the input and output ports i and j communicate with each other. With this, an upstream portion 225a and downstream portion 225b of the pressing oil passage 225 communicate with each other, so that the pressing chamber oil pressure output from the linear SV 213 is supplied to the pressing chamber 62. In contrast, when the spool 214a is located at the set position, a passage between the input and output ports i and j is closed, so that the output port j and the drain port k communicate with each other. With this, the pressing chamber oil pressure is discharged through the downstream portion 225b of the pressing oil passage 225.

Figure 7:
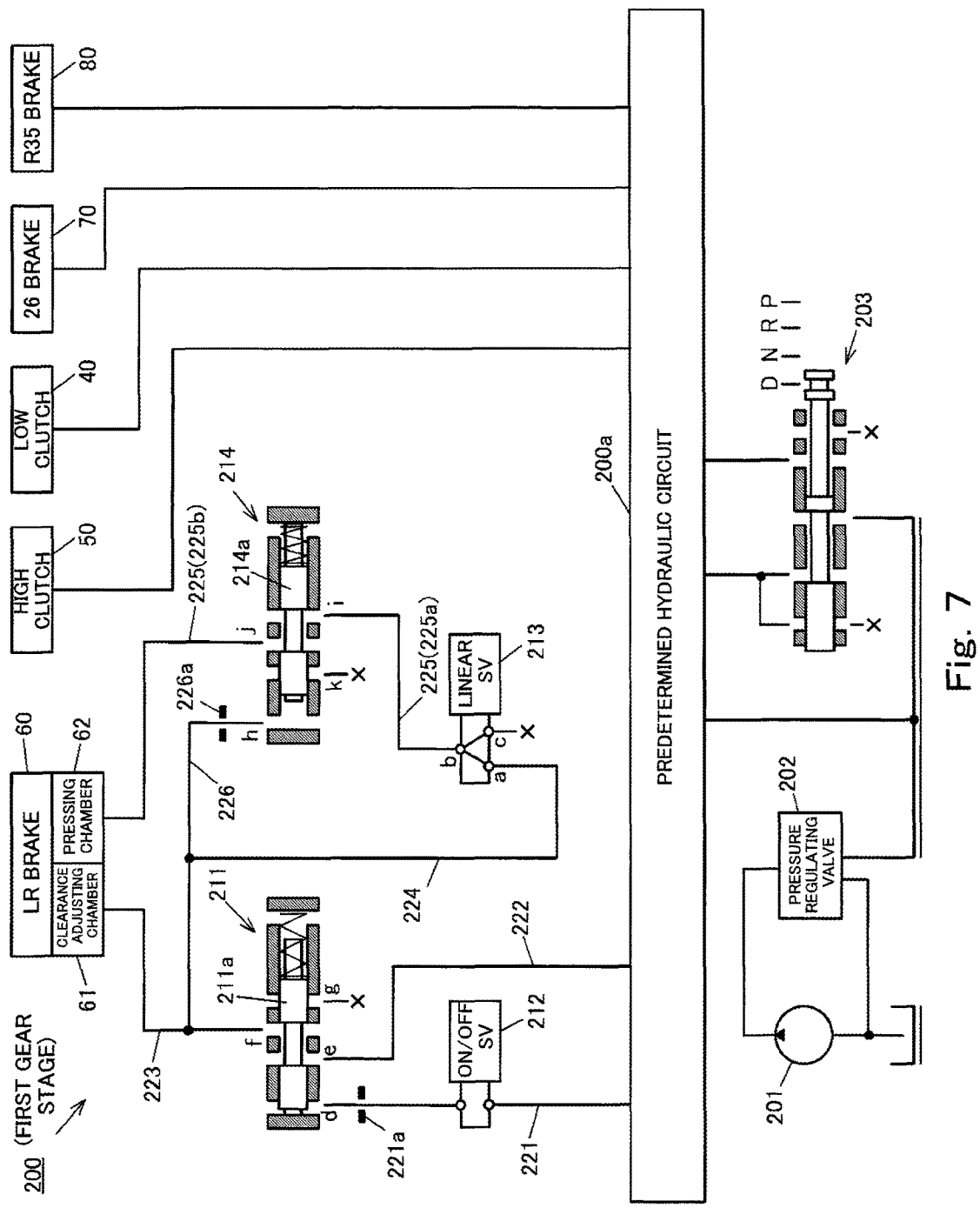
FIG. 7 is a major component circuit diagram showing a state of the first gear stage of the hydraulic control circuit according to Embodiment 2.

According to the hydraulic control circuit 200 of Embodiment 2, first, in the state of the first gear stage, as shown in FIG. 7, the on/off SV 212 discharges the pilot pressure through the control port d of the shift valve 211, and the spool 211a of the shift valve 211 is located at the set position. Therefore, the line pressure supplied through the oil passage 222 is supplied to the clearance adjusting chamber 61 of the LR brake 60 through the oil passage 223 and is also supplied as the control source pressure to the source pressure port a of the linear SV 213 through the source pressure oil passage 224.

The linear SV 113 adjusts the control source pressure into predetermined pressing chamber oil pressure, and the pressing chamber oil pressure is supplied to the input port i of the sequence valve 214 through the upstream portion 225a of the pressing oil passage 225 communicating with the pressing chamber 62 of the LR brake 60.

At this time, the pilot pressure is introduced to the control port h of the sequence valve 214 through the oil passage 226 branching from the source pressure oil passage 224, so that the spool 214a is located at the stroke position. With this, the input port i communicates with the output port j, and the pressing chamber oil pressure supplied from the linear SV 213 is supplied from the upstream portion 225a of the pressing oil passage 225 through the sequence valve 214 and the downstream portion 225b of the pressing oil passage 225 to the pressing chamber 62 of the LR brake 60.

Therefore, the LR brake 60 is engaged by the supply of the oil pressure to both the clearance adjusting chamber 61 and the pressing chamber 62. Since the low clutch 40 is also engaged, the shift gear stage of the automatic transmission 1 is the first gear stage.

Since the pilot pressure is supplied from the shift valve 211 to the control port h of the sequence valve 214, in other words, since the oil pressure is supplied from the shift valve 211 to the clearance adjusting chamber 61 of the LR brake 60, the upstream and downstream portions 225a and 225b of the pressing oil passage 225 communicate with each other. Therefore, first, the oil pressure is supplied to the clearance adjusting chamber 61 of the LR brake 60, so that the clutch clearance is made small. After that, the pressing chamber oil pressure is supplied to the pressing chamber 62 of the LR brake 60.

Therefore, a control operation of the timing of the engagement of the LR brake 60, a control operation of the engaging power of the LR brake 60, and the like are always performed in a state where the clutch clearance is made small. On this account, these control operations can be precisely performed.

Next, when shifting from the first gear stage to the second gear stage, as the shift command for shifting from the first gear stage to the second gear stage, the control device 150 outputs a control signal to the 26 brake 70 such that the 26 brake 70 is engaged, and also outputs a control signal to the linear SV 213 such that the oil pressure in the pressing chamber 62 of the LR brake 60 is discharged through the drain port c.

At this time, when the linear SV 213 normally operates, and the pressure discharge operation is appropriately performed, the pressure in the pressing chamber 62 of the LR brake 60 is discharged through the sequence valve 214. Thus, the LR brake 60 is released. Therefore, the low clutch 40 and the 26 brake 70 are engaged, so that the shift gear stage of the automatic transmission 1 becomes the second gear stage.

When the shifting to the second gear stage is terminated, the control device 150 outputs a control signal to the on/off SV 212 such that the pilot pressure is supplied to the control port d of the shift valve 211. With this, the spool 211a of the shift valve 211 moves from the set position shown in FIG.

Figure 8:
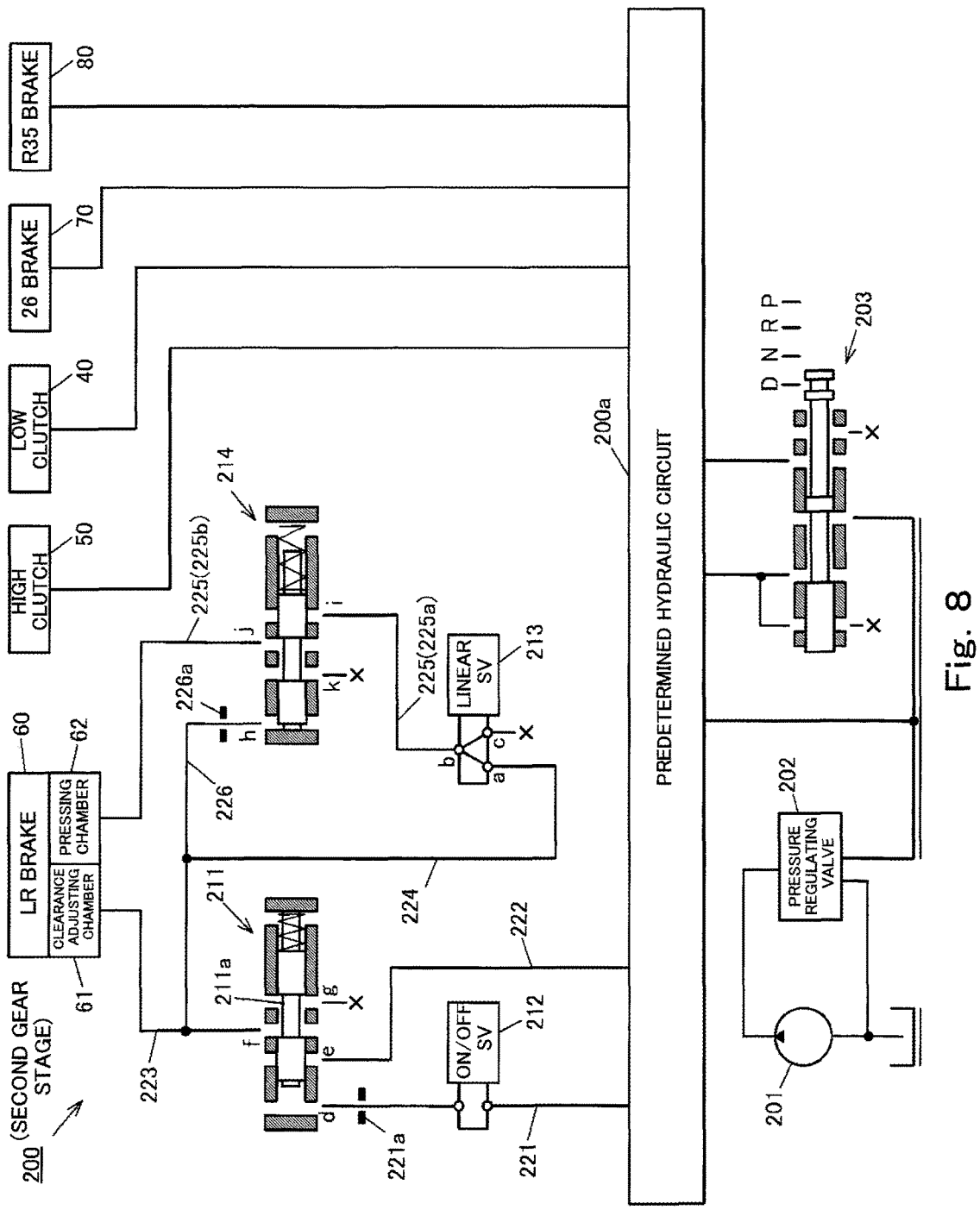
FIG. 8 is a major component circuit diagram showing a state of the second gear stage of the hydraulic control circuit according to Embodiment 2.

7 to the stroke position shown in FIG. 8, and the oil passage 223 extending between the shift valve 211 and the clearance adjusting chamber 61 of the LR brake 60 communicates with the drain port g of the shift valve 211.

With this, the oil pressure in the clearance adjusting chamber 61 is discharged. Thus, the pressure is discharged from both the oil pressure chambers 61 and 62 of the LR brake 60. Since the pilot pressure introduced to the control port h of the sequence valve 214 is also discharged, the spool 214a of the sequence valve 214 moves to the set position as shown in FIG. 8.

In contrast, in a case where the source pressure port a and output port b of the linear SV 213 keep communicating with each other by the opening malfunction when shifting from the first gear stage to the second gear stage, the pressure in the pressing chamber 62 of the LR brake 60 cannot be discharged through the drain port c of the linear SV 213. However, to discharge the pressure in the clearance adjusting chamber 61, the on/off SV 212 supplies the pilot pressure to the control port d of the shift valve 211, and in accordance with this, the spool 211a of the shift valve 211 moves to the stroke position, so that the output port f communicates with the drain port g. With this, the pressure is also discharged from the source pressure port a of the linear SV 213 through the source pressure oil passage 224 and the oil passage 223.

Therefore, even in a case where the opening malfunction of the linear SV 213 is occurring when shifting from the first gear stage to the second gear stage, the LR brake 60 is surely released by discharging the pressing chamber oil pressure in the pressing chamber 62 of the LR brake 60. Therefore, according to the hydraulic control circuit 200 of Embodiment 2, the interlock of the automatic transmission 1 is prevented, the interlock being caused due to the 26 brake 70 being engaged without releasing the LR brake 60 in a state where the low clutch 40 is engaged.

When the spool 211a of the shift valve 211 moves to the stroke position, and the pressure in the clearance adjusting chamber 61 is discharged, the pressure is also discharged through the control port h of the sequence valve 214, and therefore, the spool 214a moves to the set position. With this, the downstream portion 225b of the pressing oil passage 225 communicates with the drain port k of the sequence valve 214. Therefore, the pressure in the pressing chamber 62 can also be discharged through the drain port k.

However, since the spool 214a of the sequence valve 214 is moved to the set position by the movement of the spool 211a of the shift valve 211 to the stroke position, the pressure discharge operation of the sequence valve 214 is performed later than the pressure discharge operation of the shift valve 211. Especially, in the hydraulic control circuit 200, since the orifice 226a is provided at the oil passage 226 communicating with the control port h of the sequence valve 214, the discharge of the pilot pressure through the control port h and the movement of the spool 214a to the set position further delays.

On the other hand, according to the above configuration of the hydraulic control circuit 200, when the spool 211a of the shift valve 211 moves to the stroke position, the pressure from the source pressure port a of the linear SV 213 is discharged through the drain port g of the shift valve 211. Therefore, the pressing chamber oil pressure in the pressing chamber 62 is discharged without awaiting the movement of the spool 214a of the sequence valve 214. Thus, the interlock of the automatic transmission 1 is prevented, the interlock being caused by the delay of the discharge of the oil pressure.

According to the above configuration of the hydraulic control circuit 200, even in a case where the spool 214a of the sequence valve 214 sticks in a state where the input and output ports i and j communicate with each other in addition to the opening malfunction of the linear SV 213 when shifting from the first gear stage to the second gear stage, the oil pressure in the pressing chamber 62 is discharged from the drain port g of the shift valve 211 through the sequence valve 214 and the linear SV 213. Therefore, the interlock does not occur.

Next, the hydraulic control circuit 300 according to Embodiment 3 shown in FIGS. 9 and 10 will be explained.

As with the hydraulic control circuit 100 according to Embodiment 1 and the hydraulic control circuit 200 according to Embodiment 2, the hydraulic control circuit 300 includes a pressure regulating valve 302 and a manual valve 303. The pressure regulating valve 302 adjusts the discharge pressure of an oil pump 301 into a line pressure that is a predetermined oil pressure. The manual valve 303 switches destinations to which the line pressure is supplied, in accordance with the range selected by a driver. The line pressure is output toward the friction engaging elements 40 to 80 through a predetermined hydraulic circuit 300a including various valves. The LR brake 60 includes a tandem hydraulic actuator, and the oil pressure is supplied to the clearance adjusting chamber 61 and the pressing chamber 62.

Further, the hydraulic control circuit 300 includes a shift valve 311, an on/off SV 312, and a linear SV 313. The shift valve 311 is switched between a state of supplying the oil pressure to the clearance adjusting chamber 61 of the LR brake 60 and a state of discharging the oil pressure from the clearance adjusting chamber 61 of the LR brake 60. The on/off SV 312 switches the shift valve 311. The linear SV 313 controls the oil pressure supplied to the pressing chamber 62 of the LR brake 60. In addition, as with the hydraulic control circuit 200 according to Embodiment 2, the hydraulic control circuit 300 includes a sequence valve 314. The sequence valve 314 controls the order of the supply of the oil pressure to the clearance adjusting chamber 61 and pressing chamber 62 of the LR brake 60.

The operations of the on/off SV 312 and the linear SV 313, the configuration of the shift valve 311, and the like in Embodiment 2 are the same as those of the hydraulic control circuit 100 in Embodiment 1. The on/off SV 312 opens and closes upstream and downstream sides of an oil passage 321 on which the on/off SV 312 is disposed. When the on/off SV 312 closes the oil passage 321, the on/off SV 312 discharges the pressure at the downstream side. The linear SV 313 adjusts the oil pressure, input to the source pressure port a, into the control pressure that is a predetermined oil pressure, to output the control pressure to the output port b, or closes a passage between the ports a and b and causes the output port b to communicate with the drain port c.

The shift valve 311 includes a control port d. The control port d is provided at an end portion opposite to an end portion to which a return spring of a spool 311a is attached. When the on/off SV 312 closes the oil passage 321 to discharge the pressure through the control port d, the spool 311a is located at the set position shown in FIG. 9 by biasing force of the return spring. Therefore, when the on/off SV 312 opens the oil passage 321, the pilot pressure is introduced through an orifice 321a to the control port d. Thus, the spool 311a moves to the stroke position shown in FIG. 10 against the biasing force of the return spring.

The shift valve 311 includes an input port e and an output port f for the clearance adjusting chamber 61 of the LR brake 60 and further includes a drain port g. When the spool 311a is located at the set position, the input and output ports e and f communicate with each other. With this, the line pressure supplied through an oil passage 322 is supplied to the clearance adjusting chamber 61 of the LR brake 60 through an oil passage 323. In contrast, when the spool 311a is located at the stroke position, a passage between the input and output ports e and f is closed. With this, the output port f communicates with the drain port g, so that the pressure in the clearance adjusting chamber 61 of the LR brake 60 is discharged through the oil passage 323.

A source pressure oil passage 324 through which the control source pressure is supplied to the source pressure port a of the linear SV 313 branches from the oil passage 323 extending between the shift valve 311 and the clearance adjusting chamber 61. The hydraulic control circuit 300 includes a pressing oil passage 325 through which the pressing chamber oil pressure output from the output port b of the linear SV 313 is supplied to the pressing chamber 62 of the LR brake 60.

The sequence valve 314 is arranged so as to extend across the source pressure oil passage 324 and the pressing oil passage 325. With this, the source pressure oil passage 324 is divided into an upstream portion 324a and a downstream portion 324b, and the pressing oil passage 325 is divided into an upstream portion 325a and a downstream portion 325b.

The configuration of the sequence valve 314 will be explained in detail. The sequence valve 314 includes a control port 1. The control port 1 is provided at an end portion opposite to an end portion to which a return spring of a spool 314a is attached. Oil pressure equal to the oil pressure supplied from the shift valve 311 to the clearance adjusting chamber 61 of the LR brake 60 is supplied as the pilot pressure through an oil passage 326 and an orifice 326a to the control port 1, the oil passage 326 branching from the upstream portion 324a of the source pressure oil passage 324. Due to the pilot pressure, the spool 314a moves from the set position shown in FIG. 10 to the stroke position shown in FIG. 9 against the biasing force of the return spring.

The sequence valve 314 includes an input port m and an output port n for the source pressure oil passage 324 and further includes an input port o and an output port p for the pressing oil passage 325. The upstream and downstream portions 324a and 324b of the source pressure oil passage 324 are connected to the input and output ports m and n, respectively. The upstream and downstream portions 325a and 325b of the pressing oil passage 325 are connected to the input and output ports o and p, respectively.

Further, the sequence valve 314 includes: an input port q to which an oil passage 327 extending from the predetermined hydraulic circuit 300a is connected; a drain port r for the pressing chamber 62; and an output port s to which an oil passage 328 extending to the high clutch 50 is connected.

Figure 9:
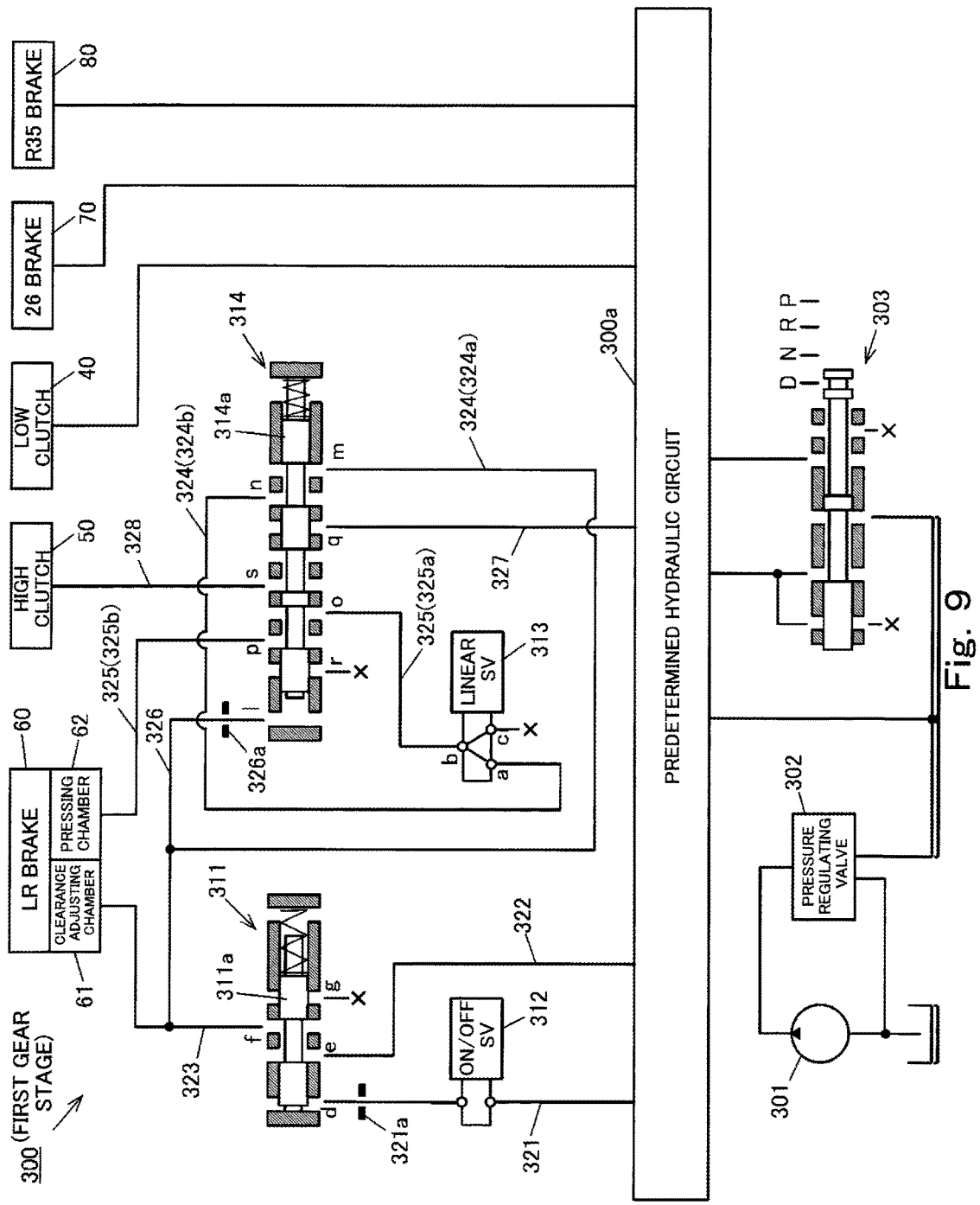
FIG. 9 is a major component circuit diagram showing the state of the first gear stage of the hydraulic control circuit according to Embodiment 3.

When the spool 314a is located at the stroke position shown in FIG. 9, the input and output ports m and n for the source pressure oil passage 324 communicate with each other, so that the upstream portion 324a and downstream portion 324b of the source pressure oil passage 324 are connected to each other. In addition, the input and output ports o and p for the pressing oil passage 325 communicate with each other, so that the upstream portion 325a and downstream portion 325b of the pressing oil passage 325 are connected to each other.

With this, the control source pressure that is the pressing chamber oil pressure supplied from the shift valve 311 can be supplied to the source pressure port a of the linear SV 313 through the upstream and downstream portions 324a and 324b of the source pressure oil passage 324. Then, the pressing chamber oil pressure output from the linear SV 313 can be supplied to the pressing chamber 62 through the upstream and downstream portions 325a and 325b of the pressing oil passage 325.

Figure 10:
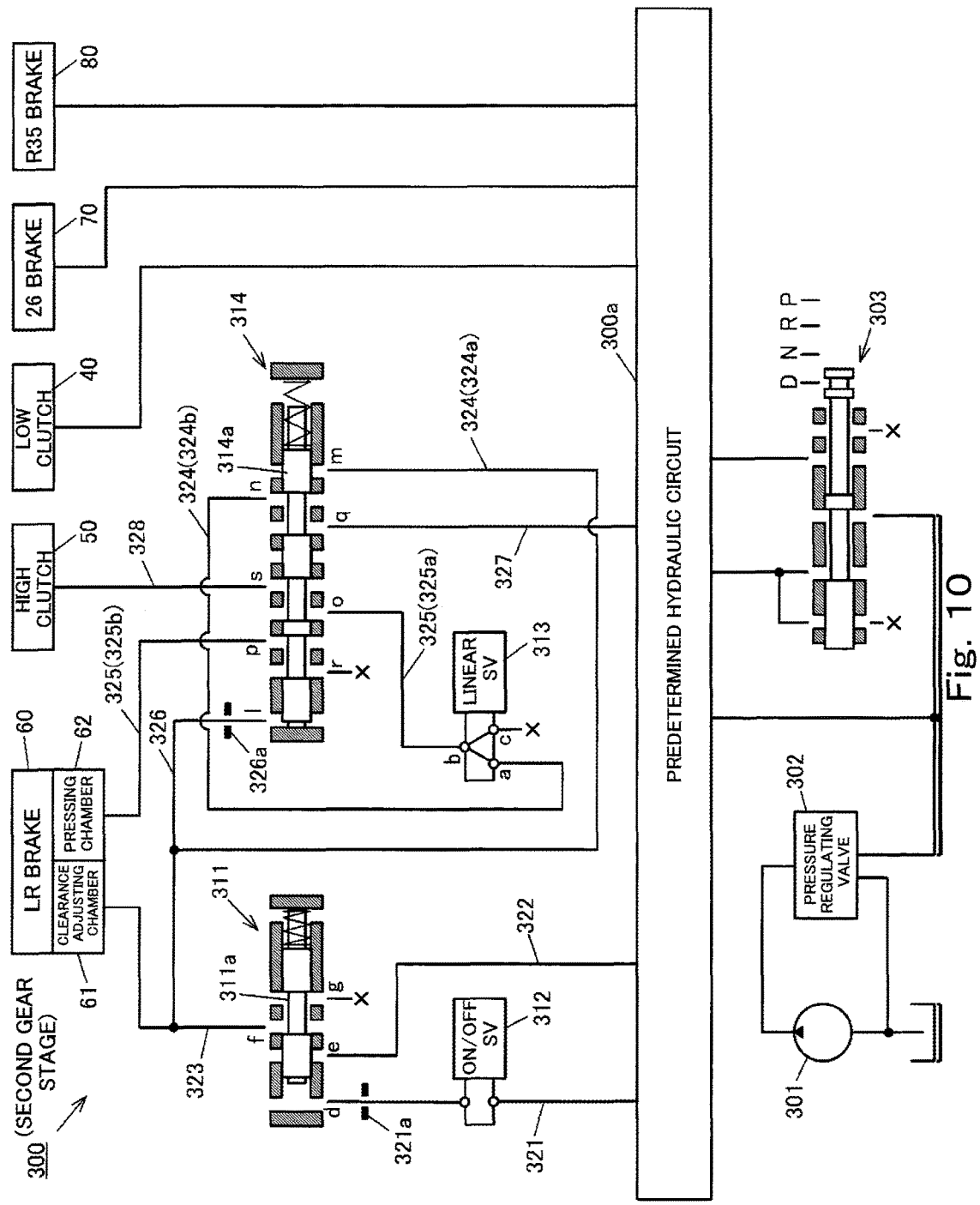
FIG. 10 is a major component circuit diagram showing the state of the second gear stage of the hydraulic control circuit according to Embodiment 3.

When the spool 314a of the sequence valve 314 is located at the set position shown in FIG. 10, a passage between the input and output ports o and p for the pressing oil passage 325 is closed, and the output port p communicates with the drain port r. With this, the pressure in the pressing chamber 62 of the LR brake 60 is discharged through the downstream portion 325b of the pressing oil passage 325.

At this time, the input port q to which the oil passage 327 extending from the predetermined hydraulic circuit 300a is connected is connected to the downstream portion 324b of the source pressure oil passage 324 through the output port n for the source pressure oil passage 324, and the input port o for the pressing oil passage 325 communicates with the output port s to which the oil passage 328 extending to the high clutch 50 is connected. With this, the line pressure from the hydraulic circuit 300a is supplied as the control source pressure to the source pressure port a of the linear SV 313, and the control pressure adjusted by the linear SV 313 is supplied to the high clutch 50.

According to the hydraulic control circuit 300 of Embodiment 3, first, at the first gear stage, as shown in FIG. 9, the on/off SV 312 discharges the pilot pressure from the control port d of the shift valve 311, and the spool 311a of the shift valve 311 is located at the set position. With this, the line pressure supplied through the oil passage 322 is supplied to the clearance adjusting chamber 61 of the LR brake 60 through the oil passage 323 and is introduced as the pilot pressure to the control port 1 of the sequence valve 314 through the oil passage 326.

Therefore, the spool 314a of the sequence valve 314 is located at the stroke position. Thus, the upstream and downstream portions 324a and 324b of the source pressure oil passage 324 communicate with each other, and the upstream and downstream portions 325a and 325b of the pressing oil passage 325 communicate with each other. On this account, the control source pressure is supplied from the shift valve 311 to the linear SV 313. The pressing chamber oil pressure generated by adjusting the control source pressure by the linear SV 313 is supplied to the pressing chamber 62 of the LR brake 60.

As a result, the LR brake 60 is engaged by the supply of the oil pressure to both the clearance adjusting chamber 61 and the pressing chamber 62. Since the low clutch 40 is also engaged, the shift gear stage of the automatic transmission 1 is the first gear stage.

Oil pressure equal to the oil pressure supplied from the shift valve 311 to the clearance adjusting chamber 61 of the LR brake 60 is supplies as the pilot pressure to the control port 1 of the sequence valve 314. With this, the upstream and downstream portions 324a and 324b of the source pressure oil passage 324 communicate with each other, and the upstream and downstream portions 325a and 225b of the pressing oil passage 325 communicate with each other. Therefore, first, the oil pressure is supplied to the clearance adjusting chamber 61 of the LR brake 60, so that the clutch clearance is made small. After that, the pressing chamber oil pressure is supplied to the pressing chamber 62 of the LR brake 60. Therefore, a control operation of the timing of the engagement of the LR brake 60, a control operation of the engaging power of the LR brake 60, and the like are always performed in a state where the clutch clearance is made small. On this account, these control operations can be precisely performed.

In this case, according to the hydraulic control circuit 300 of Embodiment 3, when the oil pressure is not supplied to the clearance adjusting chamber 61, the source pressure oil passage 324 and pressing oil passage 325 of the linear SV 313 do not open. Therefore, a case where the pressing chamber oil pressure is supplied to the pressing chamber 62 in a state where the clutch clearance is large is more surely prevented.

Next, when shifting from the first gear stage to the second gear stage, as the shift command for shifting from the first gear stage to the second gear stage, the control device 150 outputs a control signal to the 26 brake 70 such that the 26 brake 70 is engaged, and also outputs a control signal to the linear SV 313 such that the pressing chamber oil pressure in the pressing chamber 62 of the LR brake 60 is discharged through the drain port c.

At this time, when the linear SV 313 normally operates, and the pressure discharge operation is appropriately performed, the pressure in the pressing chamber 62 of the LR brake 60 is discharged through the sequence valve 314. Thus, the LR brake 60 is released. Therefore, the low clutch 40 and the 26 brake 70 are engaged, so that the shift gear stage of the automatic transmission 1 becomes the second gear stage.

When the shifting to the second gear stage is terminated, the control device 150 outputs a control signal to the on/off SV 312 such that the pilot pressure is supplied to the control port d of the shift valve 311. With this, the spool 311a of the shift valve 311 moves from the set position shown in FIG. 9 to the stroke position shown in FIG. 10, and the oil passage 323 extending between the shift valve 311 and the clearance adjusting chamber 61 of the LR brake 60 communicates with the drain port g of the shift valve 311.

With this, the oil pressure in the clearance adjusting chamber 61 is discharged. Thus, the pressure is discharged from both the oil pressure chambers 61 and 62 of the LR brake 60. Since the pilot pressure introduced to the control port 1 of the sequence valve 314 is also discharged, the spool 314a of the sequence valve 314 moves to the set position as shown in FIG. 10.

In contrast, in a case where the source pressure port a and output port b of the linear SV 313 keep communicating with each other by the opening malfunction when shifting from the first gear stage to the second gear stage, the pressure in the pressing chamber 62 of the LR brake 60 cannot be discharged through the drain port c of the linear SV 313. However, to discharge the pressure in the clearance adjusting chamber 61, the on/off SV 312 supplies the pilot pressure to the control port d of the shift valve 311, and in accordance with this, the spool 311a of the shift valve 311 moves to the stroke position, so that the output port f communicates with the drain port g. With this, the source pressure port a of the linear SV 313 also communicates with the drain port g of the shift valve 311 through the upstream and downstream portions 324a and 324b of the source pressure oil passage 324 and the oil passage 323, and the oil pressure is discharged through the port g.

Therefore, even in a case where the opening malfunction of the linear SV 313 is occurring when shifting from the first gear stage to the second gear stage, the LR brake 60 is surely released by discharging the pressing chamber oil pressure in the pressing chamber 62 of the LR brake 60. Therefore, according to the hydraulic control circuit 300 of Embodiment 3, the interlock of the automatic transmission 1 is prevented, the interlock being caused due to the 26 brake 70 being engaged without releasing the LR brake 60 in a state where the low clutch 40 is engaged.

When the spool 311a of the shift valve 311 moves to the stroke position, and the pressure in the clearance adjusting chamber 61 is discharged, the pressure is also discharged through the control port 1 of the sequence valve 314, and therefore, the spool 314a moves to the set position. With this, the downstream portion 325b of the pressing oil passage 325 communicates with the drain port r of the sequence valve 314. Therefore, the pressure in the pressing chamber 62 can also be discharged through the drain port r.

However, since the spool 314a of the sequence valve 314 is moved to the set position by the movement of the spool 311a of the shift valve 311 to the stroke position, the pressure discharge operation of the sequence valve 314 is performed later than the pressure discharge operation of the shift valve 311. Especially, since the orifice 326a is provided at the oil passage 326 communicating with the control port 1 of the sequence valve 314, the discharge of the pilot pressure through the control port 1 and the movement of the spool 314a to the set position is further delayed.

On the other hand, according to the above configuration of the hydraulic control circuit 300, when the spool 311a of the shift valve 311 moves to the stroke position, the pressure from the source pressure port a of the linear SV 313 is discharged through the drain port g of the shift valve 311. Therefore, the oil pressure in the pressing chamber 62 is discharged without awaiting the movement of the spool 314a of the sequence valve 314. Thus, as with the hydraulic control circuit 200 according to Embodiment 2, the interlock of the automatic transmission 1 is prevented, the interlock being caused by the delay of the discharge of the oil pressure.

According to the above configuration of the hydraulic control circuit 300, even in a case where the spool 314a of the sequence valve 314 sticks in addition to the opening malfunction of the linear SV 313 when shifting from the first gear stage to the second gear stage in a state where the input and output ports m and n for the source pressure oil passage 324 communicate with each other and the input and output ports o and p for the pressing oil passage 325 communicate with each other, that is, in a state where the spool 314a of the sequence valve 314 is located at the stroke position, the pressing chamber oil pressure is discharged from the drain port g of the shift valve 311 through the sequence valve 314 and the linear SV 313. Therefore, the interlock does not occur.

Further, according to the hydraulic control circuit 300, when shifting from the first gear stage to the second gear stage, the spool 311a of the shift valve 311 moves to the stroke position. In accordance with this, the pressure in the clearance adjusting chamber 61 of the LR brake 60 is discharged, and at the same time, the pilot pressure is discharged from the control port 1 of the sequence valve 314. With this, when the spool 314a moves to the set position, as shown in FIG. 10, the ports q and n of the sequence valve 314 communicate with each other. Therefore, the line pressure from the predetermined hydraulic circuit 300a is supplied as the control source pressure to the source pressure port a of the linear SV 313 through the oil passage 327, the sequence valve 314, and the downstream portion 324b of the source pressure oil passage 324.

At this time, the ports o and s of the sequence valve 314 also communicate with each other. To shift up the shift gear stage to the fourth gear stage in this state, the sequence valve 314 is switched such that the input and output ports a and b communicate with each other. With this, after the control source pressure supplied from the predetermined hydraulic circuit 300a is adjusted into predetermined control pressure by the linear SV 313, the control pressure is supplied to the high clutch 50 through the upstream portion 325a of the pressing oil passage 325, the sequence valve 314, and the oil passage 328. Thus, the high clutch 50 is engaged.

To be specific, the linear SV 313 configured to control the oil pressure supplied to the pressing chamber 62 of the LR brake 60 to engage the LR brake 60 at the first gear stage is also used to control the oil pressure for engaging the high clutch 50 at the fourth gear stage. Therefore, the configuration of the hydraulic control circuit is simpler than a case where a linear SV for the LR brake 60 and a linear SV for the high clutch 50 are provided.

As described above, when shifting up the shift gear stage to the fourth gear stage, the control pressure generated by the linear SV 313 is supplied to the high clutch 50 through the sequence valve 314 and the oil passage 328. If the linear SV 313 generates the control pressure when the spool 314a of the sequence valve 314 sticks at the stroke position, the control pressure is supplied not to the high clutch 50 but to the pressing chamber 62 of the LR brake 60. Thus, the shift gear stage of the automatic transmission 1 shifts to the first gear stage.

To be specific, when the spool 314a of the sequence valve 314 sticks at the stroke position, the input and output ports o and p for the pressing chamber communicate with each other. With this, the output port b of the linear SV 313 communicates with the pressing chamber 62 of the LR brake 60 through the upstream and downstream portions 325a and 325b of the pressing oil passage 325. Therefore, when the linear SV 313 generates the control pressure, the control pressure is supplied to the pressing chamber 62 of the LR brake 60.

In this case, at the shift gear stages other than the first gear stage (and the reverse gear stage), the spool 311a of shift valve 311 is located at the stroke position, and the pressure in the clearance adjusting chamber 61 of the LR brake 60 is discharged. However, even when the pressure in the clearance adjusting chamber 61 is discharged in a case where the tandem hydraulic actuator shown in FIGS. 11A and 11B is adopted, the LR brake 60 is engaged by the supply of the oil pressure to the pressing chamber 62. As a result, the shift gear stage of the automatic transmission 1 shifts to the first gear stage when the shift gear stage of the automatic transmission 1 should shift to the fourth gear stage. This may cause abnormalities, such as rapid deceleration of the vehicle and overspeed of the engine.

However, according to the configuration of the hydraulic control circuit 300, when the spool 314a of the sequence valve 314 sticks at the stroke position, the upstream and downstream portions 325a and 325b of the pressing oil passage 325 extending from the linear SV 313 communicate with each other. At the same time, the downstream portion 324b of the source pressure oil passage 324 through which the control source pressure is supplied to the linear SV 313 communicates with the upstream portion 324a of the source pressure oil passage 324 extending from the shift valve 311.

Since the upstream portion 324a of the source pressure oil passage 324 communicates with the drain port g of the shift valve 311 through the oil passage 323, the source pressure is not supplied to the linear SV 313. Therefore, even when the upstream and downstream portions 325a and 325b of the pressing oil passage 325 extending between the linear SV 313 and the pressing chamber 62 of the LR brake 60 communicate with each other, the control pressure is not supplied to the pressing chamber 62 of the LR brake 60.

With this, even in a case where a command for generating the control pressure for the high clutch 50 is output to the linear SV 313 in a state where the spool 314a of the sequence valve 314 sticks at the stroke position when shifting up the shift gear stage to the fourth gear stage, the control pressure is not supplied to the pressing chamber 62 of the LR brake 60. Thus, abnormalities such as the rapid deceleration of the vehicle and the overspeed of the engine caused when shifting from, for example, the third gear stage to the first gear stage are prevented from occurring.

The hydraulic control circuit 300 according to Embodiment 3 is configured by adding functions to the hydraulic control circuit 200 according to Embodiment 2, the functions being: a function in which the sequence valve 314 divides the source pressure oil passage 324 into the upstream and downstream portions and causes the upstream and downstream portions of the source pressure oil passage 324 to communicate with each other or be separated from each other; and a function in which the linear SV 313 is also used for the control of the oil pressure for the high clutch 50. However, the hydraulic control circuit 300 may be configured such that only one of the above functions is added to the sequence valve 214 of the hydraulic control circuit 200 of Embodiment 2.

The configuration of a power transmission mechanism of the automatic transmission to which the present invention is applied is not limited to the configuration schematically shown in FIG. 1. For example, each of an automatic transmission disclosed in Japanese Laid-Open Patent Application Publication No. 2009-14142 and an automatic transmission disclosed Japanese Laid-Open Patent Application Publication No. 2010-209934, each of which schematically discloses a power transmission mechanism, includes: a friction engaging element engaged at the first to fourth gear stages and corresponding to the low clutch 40; a friction engaging element engaged at the fourth to sixth gear stages and corresponding to the high clutch 50; a friction engaging element engaged at the first gear stage and the reverse gear stage and corresponding to the LR brake 60; a friction engaging element engaged at the second gear stage and the sixth gear stage and corresponding to the 26 brake 70; and a friction engaging element engaged at the third gear stage, the fifth gear stage, and the reverse gear stage and corresponding to the R35 brake 80. The present invention is also applicable to each of these automatic transmissions.

INDUSTRIAL APPLICABILITY

As above, according to the hydraulic control device of the automatic transmission of the present invention, problems which may occur at the time of the failure of the hydraulic control valve due to the discontinuation of the OWC are prevented from occurring. Therefore, the present invention may be suitably utilized in the technical field of manufacture of this type of automatic transmission or the vehicle including the automatic transmission.

REFERENCE CHARACTER LIST 1 automatic transmission
50 another friction engaging element (high clutch)
60 friction engaging element (LR brake)
111, 211, 311 switching valve (shift valve)
113, 213, 313 hydraulic control valve (linear SV)
214, 314 second switching valve (sequence valve)

124, 224, 324 source pressure oil passage
125, 225, 325 pressing oil passage

The invention claimed is:

1. A hydraulic control device of an automatic transmission including a friction engaging element having a clearance adjusting chamber and a pressing chamber, the hydraulic control device comprising:
 a switching valve configured to be switched between a state of supplying oil pressure to the clearance adjusting chamber and a state of discharging the oil pressure from the clearance adjusting chamber;
 a hydraulic control valve configured to control supply of the oil pressure to the pressing chamber; and
 a source pressure oil passage through which oil pressure equal to the oil pressure supplied from the switching valve to the clearance adjusting chamber is supplied to a source pressure port of the hydraulic control valve.

2. The hydraulic control device according to claim 1, wherein a second switching valve is disposed on a pressing oil passage through which the oil pressure is supplied from the hydraulic control valve to the pressing chamber, the second switching valve becoming a first state when the oil pressure supplied from the switching valve to the clearance adjusting chamber is not less than a predetermined pressure and becoming a second state when the oil pressure supplied from the switching valve to the clearance adjusting chamber is less than the predetermined pressure, the first state being a state where the second switching valve opens the pressing oil passage, the second state being a state where the second switching valve closes the pressing oil passage and discharges the oil pressure in the pressing chamber.

3. The hydraulic control device according to claim 2, wherein:
 the source pressure oil passage extends through the second switching valve; and
 the second switching valve opens the source pressure oil passage when the second switching valve is in the first state, and the second switching valve closes the source pressure oil passage when the second switching valve is in the second state.

4. The hydraulic control device according to claim 2, wherein when the second switching valve closes the pressing oil passage and discharges the oil pressure in the pressing chamber in the second state, the second switching valve connects an upstream portion of the pressing oil passage, which extends from the hydraulic control valve, to an oil passage communicating with another friction engaging element.

5. The hydraulic control device according to claim 1, wherein when releasing the friction engaging element during shifting by discharging the oil pressure from the clearance adjusting chamber and the pressing chamber, but when the oil pressure in the pressing chamber is not discharged due to malfunction of the hydraulic control valve, a control source pressure of the hydraulic control valve is discharged by discharging the oil pressure in the clearance adjusting chamber by the switching valve, and thereby the oil pressure in the pressing chamber is discharged.

6. The hydraulic control device according to claim 3, wherein when the second switching valve closes the pressing oil passage and discharges the oil pressure in the pressing chamber in the second state, the second switching valve connects an upstream portion of the pressing oil passage, which extends from the hydraulic control valve, to an oil passage communicating with another friction engaging element.

* * * * *